United States Patent
Jung

(10) Patent No.: US 10,116,353 B2
(45) Date of Patent: Oct. 30, 2018

(54) CONTACTLESS COMMUNICATION DEVICE AND ELECTRONIC SYSTEM HAVING THE SAME

(71) Applicant: Samsung Electronics Co., Ltd., Suwon-si, Gyeonggi-do (KR)

(72) Inventor: Hong-Jip Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 81 days.

(21) Appl. No.: 15/283,732

(22) Filed: Oct. 3, 2016

(65) Prior Publication Data
US 2017/0126279 A1 May 4, 2017

(30) Foreign Application Priority Data
Oct. 28, 2015 (KR) .......................... 10-2015-0150407

(51) Int. Cl.
| | |
|---|---|
| H04B 5/00 | (2006.01) |
| H04L 7/00 | (2006.01) |
| G06F 1/04 | (2006.01) |
| H04W 4/80 | (2018.01) |

(52) U.S. Cl.
CPC ............. *H04B 5/0031* (2013.01); *G06F 1/04* (2013.01); *H04L 7/0012* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 5,930,304 | A * | 7/1999 | Hollenbeck .......... | G06K 13/077 375/259 |
| 5,940,447 | A * | 8/1999 | Connell ............. | G06K 7/10336 235/379 |
| 7,852,099 | B1 | 12/2010 | Clark | |
| 8,595,543 | B2 | 11/2013 | Chiang et al. | |
| 8,677,173 | B2 | 3/2014 | Wang et al. | |
| 8,810,321 | B2 | 8/2014 | Choi | |
| 9,706,497 | B2 * | 7/2017 | Tian ........................ | H04B 5/00 |
| 2003/0121985 | A1 * | 7/2003 | Baldischweiler .. | G06K 19/0707 235/492 |
| 2011/0011934 | A1 * | 1/2011 | Iwamura ............ | G06K 19/0701 235/435 |
| 2014/0043003 | A1 | 2/2014 | Lee | |

(Continued)

FOREIGN PATENT DOCUMENTS

| | | |
|---|---|---|
| JP | 10-93640 | 4/1998 |
| JP | 2012-088979 A | 5/2012 |

(Continued)

*Primary Examiner* — Junpeng Chen
(74) *Attorney, Agent, or Firm* — Harness, Dickey & Pierce, P.L.C.

(57) ABSTRACT

A contactless communication device includes a transceiver and a contactless communication chip. The transceiver generates an antenna voltage based on an electromagnetic wave received from an external device. The contactless communication chip generates an internal clock signal, operates based on the internal clock signal, and communicates with the external device using the transceiver. The contactless communication chip generates a reference clock signal based on the antenna voltage and adjusts a frequency of the internal clock signal based on the reference clock signal.

20 Claims, 10 Drawing Sheets

(56) References Cited

U.S. PATENT DOCUMENTS

| | | | |
|---|---|---|---|
| 2014/0218123 A1 | 8/2014 | Wei et al. | |
| 2014/0232475 A1 | 8/2014 | Elkholy et al. | |
| 2014/0327486 A1 | 11/2014 | Roine et al. | |
| 2015/0072737 A1* | 3/2015 | Morita | G06K 7/10237 455/558 |
| 2015/0146832 A1 | 5/2015 | Deval et al. | |

FOREIGN PATENT DOCUMENTS

| | | | |
|---|---|---|---|
| JP | 2013-058947 A | | 3/2013 |
| JP | 2013058947 A | * | 3/2013 |
| JP | 2013-098614 A | | 5/2013 |

* cited by examiner

LT

| CNT2-REFV | T_V |
|---|---|
| −n | tv(−n) |
| −(n−1) | tv(−(n−1)) |
| ⋮ | ⋮ |
| −1 | tv(−1) |
| 0 | tv(0) |
| 1 | tv(1) |
| ⋮ | ⋮ |
| n−1 | tv(n−1) |
| n | tv(n) |

CONTACTLESS COMMUNICATION DEVICE AND ELECTRONIC SYSTEM HAVING THE SAME

CROSS-REFERENCE TO RELATED APPLICATION(S)

This application claims priority under 35 USC § 119 to Korean Patent Application No. 10-2015-0150407, filed on Oct. 28, 2015 in the Korean Intellectual Property Office (KIPO), the contents of which are herein incorporated by reference in their entirety.

BACKGROUND

1. Technical Field

Example embodiments relate to a wireless communication technology. For example, at least some example embodiments relate to a contactless communication chip, a contactless communication device including the contactless communication chip and/or an electronic system including the contactless communication device.

2. Description of the Related Art

Recently, a contactless communication device such as a near field communication (NFC) device has been extensively employed in mobile devices.

A contactless communication device can operate in a reader mode (i.e., operates as a contactless communication reader for contactlessly reading a contactless communication card) or in a card mode (i.e., operates as a contactless communication card). In the reader mode, the contactless communication device emits an electromagnetic wave to communicate with an external contactless communication card. In the card mode, the contactless communication device communicates with an external contactless communication reader based on an electromagnetic wave emitted by the external contactless communication reader.

Generally, the contactless communication device may emit an electromagnetic wave in the reader mode using a clock signal received from outside or using a clock signal generated internally, such that the electromagnetic wave emitted by the contactless communication device has a desired frequency defined in, for example, a communication standard.

If the contactless communication device emits an electromagnetic wave using a clock signal received from outside, a manufacturing cost and a size of the contactless communication device may increase.

On the other hand, if a contactless communication device emits an electromagnetic wave using a clock signal generated internally, while the manufacturing cost and size may decrease, a correctness of a frequency of the electromagnetic wave may decrease and the frequency of the electromagnetic wave may be changed according to temperature.

SUMMARY

Some example embodiments are directed to provide a contactless communication device that may increase the accuracy of a frequency of a clock signal generated internally.

In some example embodiments, the contactless communication device may include a transceiver configured to generate an antenna voltage based on an electromagnetic wave received from an external device; and a contactless communication chip configured to, generate a reference clock signal based on the antenna voltage, adjust a frequency of an internal clock signal based on the reference clock signal, and communicate, via the transceiver, with the external device based on the internal clock signal.

In some example embodiments, the contactless communication chip is configured to, generate a count number by determining a number of cycles of the internal clock signal occurring within a reference number of cycles of the reference clock signal, and adjust the frequency of the internal clock signal based on the count number and the reference number of cycles.

In some example embodiments, the contactless communication chip is configured to, determine an average count number by iteratively determining a number of cycles of the internal clock signal occurring within a reference number of cycles of the reference clock signal, and adjust the frequency of the internal clock signal based on the average count number and the reference number of cycles.

In some example embodiments, the contactless communication chip comprises: a clock generator configured to generate the internal clock signal; a clock recovery circuit configured to receive the antenna voltage, and to generate the reference clock signal having a same frequency as the antenna voltage; a first counter configured to, perform a count operation in synchronization with the reference clock signal to generate a first count number, if the first counter receives a start signal, and output a finish signal, if the first count number equals a reference number; a second counter configured to, perform a count operation in synchronization with the internal clock signal to generate a second count number, if the second counter receives the start signal, and output the second count number, if the first counter outputs the finish signal; and a central processing unit (CPU) configured to, provide the start signal to the first counter and the second counter at a same time, and control the clock generator to adjust the frequency of the internal clock signal based on the second count number and the reference number.

In some example embodiments, the CPU is configured to, increase the frequency of the internal clock signal, if the second count number is smaller than the reference number, and decrease the frequency of the internal clock signal if the second count number is greater than the reference number.

In some example embodiments, the contactless communication chip further includes a register configured to store a trimming value, the clock generator is configured to generate the internal clock signal having a frequency determined based on the trimming value, and the CPU is configured to adjust the trimming value stored in the register based on the second count number and the reference number.

In some example embodiments, contactless communication device further includes a memory configured to store a lookup table including a plurality of trimming values each associated with a difference between the second count number and the reference number, and, wherein the CPU is configured to determine the trimming value to store in the register by selecting one of the plurality of trimming values from the lookup table based on the second count number and the reference number.

In some example embodiments, the clock generator includes a resistor-capacitor (RC) oscillator, the RC oscillator including a variable resistor having a resistance which varies based on the trimming value stored in the register.

In some example embodiments, the clock generator includes a resistor-capacitor (RC) oscillator, the RC oscillator including a variable capacitor having a capacitance which varies based on the trimming value stored in the register.

In some example embodiments, the CPU is configured to, detect whether a contactless communication reader is near the contactless communication device based on the antenna voltage, and provide the start signal to the first counter and the second counter at the same time, if the CPU detects that the contactless communication reader is near the contactless communication device.

In some example embodiments, the CPU is configured to determine the reference number such that a period of the reference clock signal times the reference number is less than a guard time defined in a communication standard.

In some example embodiments, the CPU is configured to, determine an average of the second count number by iteratively providing the start signal to the first counter and the second counter at the same time and receive the second count number from the second counter until the guard time elapses, and adjust the frequency of the internal clock signal by controlling the clock generator based on the average of the second count number and the reference number.

In some example embodiments, the CPU is configured to operate in synchronization with the internal clock signal.

In some example embodiments, the clock recovery circuit comprises an inverter configured to invert the antenna voltage.

In some example embodiments, the transceiver is configured to generate the antenna voltage such that a frequency of the antenna voltage is equal to a frequency of the electromagnetic wave received from the external device.

In some example embodiments, the transceiver is configured to generate the antenna voltage through a mutual induction with the external device.

In some example embodiments, the transceiver comprises an antenna configured to receive the electromagnetic wave; and a matching circuit coupled between the antenna and the contactless communication chip, the matching circuit configured to perform impedance matching between the antenna and the contactless communication chip.

In some example embodiments, the contactless communication chip is configured to communicate with the external device through a near field communication (NFC) scheme.

Some example embodiments are directed to an electronic system including the contactless communication device.

In some example embodiments, the electronic system includes a memory device configured to store data; an application processor configured to control the electronic system; and a contactless communication device configured to transfer data between the contactless communication device and an external device using an electromagnetic wave.

In some example embodiments, the contactless communication device includes a transceiver configured to generate an antenna voltage based on an electro magnetic wave received from the external device, and a contactless communication chip configured to, generate a reference clock signal based on the antenna voltage, adjust a frequency of an internal clock signal based on the reference clock signal, and communicate, via the transceiver, with the external device based on the internal clock signal.

Some example embodiments are directed to a method of operating the contactless communication device.

In some example embodiments, the method includes generating, in a card mode, an antenna voltage using a transceiver based on an electromagnet wave received from an external device; generating a reference clock signal based on the antenna voltage; generating an internal clock signal using a clock generator; and adjusting a frequency of the internal clock signal based on the reference clock signal.

In some example embodiments, the adjusting includes generating a count number by determining a number of cycles of the internal clock signal occurring within a reference number of cycles of the reference clock signal; and adjusting the frequency of the internal clock signal based on the count number and the reference number of cycles.

In some example embodiments, the adjusting the frequency of the internal clock signal based on the count number and the reference number of cycles comprises increasing the frequency of the internal clock signal, if the count number is less than the reference number of cycles; and decreasing the frequency of the internal clock signal, if the count number is greater than the reference number of cycles.

In some example embodiments, the adjusting the frequency of the internal clock signal based on the count number and the reference number of cycles comprises: storing, in a register, a trimming value based on the count number and the reference number of cycles; and adjusting the frequency of the internal clock signal based on based on the trimming value stored in the register.

Some example embodiments are directed to a contactless communication chip.

In some example embodiments, the contactless communication chip includes a processor configured to, instruct a clock recovery circuit to generate a reference clock signal based on an antenna voltage received from an external device via a transceiver, instruct a clock generator to adjust a frequency of an internal clock signal based on the reference clock signal, and instruct, via a transmission circuit, the transceiver to communicate with the external device based on the internal clock signal.

In some example embodiments, the contactless communication chip further includes the clock generator configured to generate the internal clock signal; and the clock recovery circuit configured to generate the reference clock signal such that the reference clock signal has a same frequency as the antenna voltage, wherein the processor is configured to instruct the clock generator to adjust the frequency of the internal clock signal such that the frequency of the internal clock signal is equal to the frequency of an electromagnetic wave EMW received from the external device in a card mode.

In some example embodiments, the contactless communication chip further includes a first counter configured to perform a count operation in synchronization with the reference clock signal to generate a first count number, if the first counter receives a start signal, and output a finish signal, if the first count number equals a reference number; and a second counter configured to, perform a count operation in synchronization with the internal clock signal to generate a second count number, if the second counter receives the start signal, and output the second count number, if the first counter outputs the finish signal, and wherein the processor is configured to output the start signal to the first counter and the second counter at a same time, if the processor detects the external device.

In some example embodiments, the processor is configured to modulate output data to generate a modulation signal, and to synthesize the modulated signal with the internal clock signal having a carrier frequency defined in the communication standard supported by the external device.

BRIEF DESCRIPTION OF THE DRAWINGS

Illustrative, non-limiting example embodiments will be more clearly understood from the following detailed description in conjunction with the accompanying drawings.

DETAILED DESCRIPTION

Figure 1:
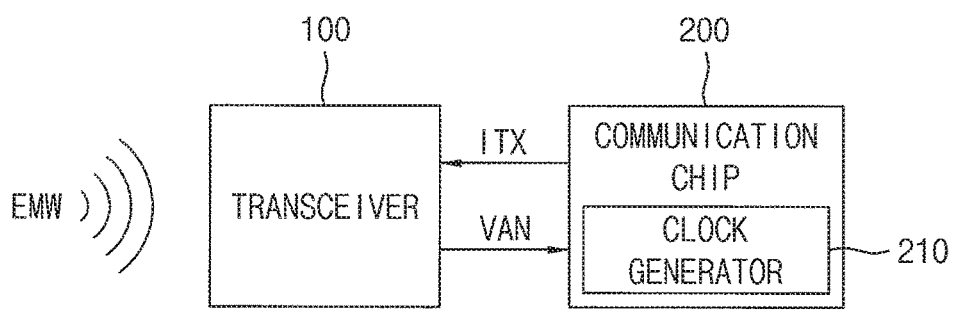
FIG. 1 is a block diagram illustrating a contactless communication device according to example embodiments.

Various example embodiments will be described more fully with reference to the accompanying drawings, in which some example embodiments are shown. Example embodiments of the inventive concepts may, however, be embodied in many different forms and should not be construed as limited to the example embodiments set forth herein. Rather, these example embodiments are provided so that this disclosure will be thorough and complete, and will fully convey the scope of the example embodiments of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the example embodiments of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the example embodiments of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

FIG. 1 is a block diagram illustrating a contactless communication device according to example embodiments.

Referring to FIG. 1, a contactless communication device 10 may communicate with an external device using an electromagnetic wave EMW.

In some example embodiments, the contactless communication device 10 may correspond to a near field communication (NFC) device which performs a communication using an electromagnetic wave having a frequency of 13.56 MHz. However, example embodiments are not limited thereto. According to example embodiments, the contactless communication device 10 may correspond to any contactless communication device which performs a communication using an electromagnetic wave having a frequency defined in a communication standard.

When the contactless communication device 10 is turned on, the contactless communication device 10 may perform an operation of detecting whether a contactless communication reader and/or a contactless communication card is near the contactless communication device 10.

When the contactless communication device 10 detects a contactless communication reader near the contactless communication device 10, the contactless communication device 10 may operate in a card mode, in which the contactless communication device 10 operates as a smart card. In the card mode, the contactless communication device 10 may communicate data (e.g., transmit and receive data) with the contactless communication reader using an electromagnetic wave EMW emitted from the contactless communication reader.

When the contactless communication device 10 detects a contactless communication card near the contactless communication device 10, the contactless communication device 10 may operate in a reader mode, in which the contactless communication device 10 operates as a reader. In the reader mode, the contactless communication device 10 may emit an electromagnetic wave EMW to communicate data with the contactless communication card.

Referring to FIG. 1, the contactless communication device 10 may include a transceiver 100 and a contactless communication chip 200.

The transceiver 100 may include a resonance circuit which includes an antenna having an inductance and a resonance capacitor.

The contactless communication chip 200 may include a clock generator 210 which generates an internal clock signal. The contactless communication chip 200 may operate based on the internal clock signal, which is internally generated by the clock generator 210, without receiving a clock signal from outside.

In some example embodiments, a frequency of the internal clock signal may correspond to a carrier frequency defined in the communication standard. For example, when the contactless communication device 10 is an NFC device, the frequency of the internal clock signal generated by the clock generator 210 may correspond to 13.56 MHz.

Reader Mode

In the reader mode, the contactless communication chip 200 may modulate output data using the internal clock signal to generate an output current ITX, and the transceiver 100 may emit an electromagnetic wave EMW corresponding to the output current ITX to communicate data with the contactless communication card. Since the contactless communication card includes a resonance circuit which includes an antenna having an inductance and a resonance capacitor, a mutual induction may occur between the transceiver 100 and the contactless communication card, when the contactless communication card is located near the transceiver 100, while the transceiver 100 emits the electromagnetic wave EMW. In this case, an antenna voltage VAN may be generated at the resonance circuit of the transceiver 100 through the mutual induction with the contactless communication card. The contactless communication chip 200 may demodulate the antenna voltage VAN generated by the transceiver 100 to obtain data transmitted from the contactless communication card.

Card Mode

In the card mode, a mutual induction may occur between the transceiver 100 and the contactless communication reader by the electromagnetic wave EMW emitted from the contactless communication reader. In this case, the antenna voltage VAN may be generated at the resonance circuit of the transceiver 100 through the mutual induction with the contactless communication reader. To perform a receive operation in the card mode, the transceiver 100 may provide the antenna voltage VAN to the contactless communication chip 200 and the contactless communication chip 200 may demodulate the antenna voltage VAN to obtain data transmitted from the contactless communication reader. To perform a transmit operation in the card mode, the contactless communication chip 200 may provide the transceiver 100 with an impedance corresponding to a modulated signal, which is generated by modulating output data, and the transceiver 100 may cause the mutual induction with the contactless communication reader based on the impedance using the electromagnetic wave EMW emitted from the contactless communication reader.

Figure 2:
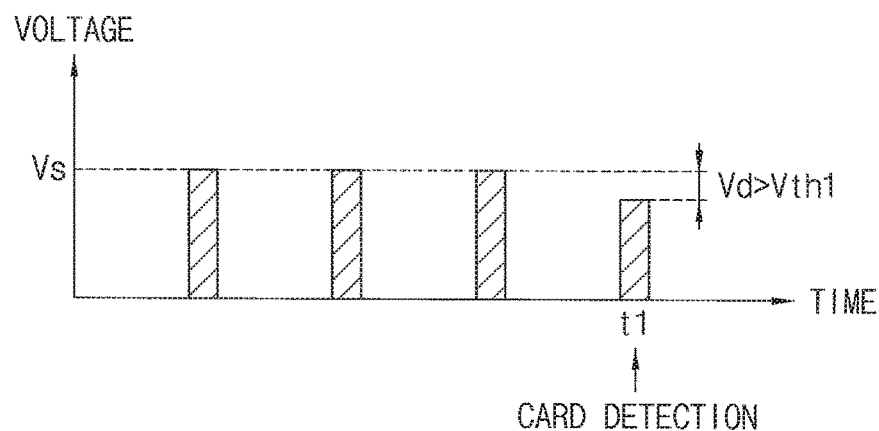
FIG. 2 is a diagram for describing an operation of the contactless communication device of FIG. 1 to detect whether a contactless communication card is near the contactless communication device.

FIG. 2 is a diagram for describing an operation of the contactless communication device of FIG. 1 to detect whether a contactless communication card is near the contactless communication device.

In FIG. 2, x-axis represents a time and y-axis represents the antenna voltage VAN generated by the transceiver 100.

As illustrated in FIG. 2, to detect whether a contactless communication card is near the contactless communication device 10, the contactless communication chip 200 may periodically provide the output current ITX corresponding to an unmodulated carrier signal to the transceiver 100, and the transceiver 100 may periodically emit the electromagnetic wave EMW corresponding to the output current ITX.

When a contactless communication card is not near the contactless communication device 10, a mutual induction may not occur at the transceiver 100, such that a magnitude of the antenna voltage VAN generated by the transceiver 100 while the transceiver 100 emits the electromagnetic wave EMW may be maintained as a standard voltage Vs.

However, as illustrated in FIG. 2, when a contactless communication card, which includes a resonance circuit that includes an antenna having an inductance and a resonance capacitor, approaches the contactless communication device 10 at a time t1, a mutual induction may occur between the transceiver 100 and the contactless communication card, such that the magnitude of the antenna voltage VAN generated by the transceiver 100 may be smaller than the standard voltage Vs.

Therefore, the contactless communication chip 200 may determine that the contactless communication card is near the contactless communication device 10 when the magnitude of a difference Vd between the antenna voltage VAN generated by the transceiver 100 and the standard voltage Vs is greater than a first threshold voltage Vth1.

When the contactless communication device 10 detects that the contactless communication card is near the contactless communication device 10, the contactless communication device 10 may operate in the reader mode.

Figure 3:
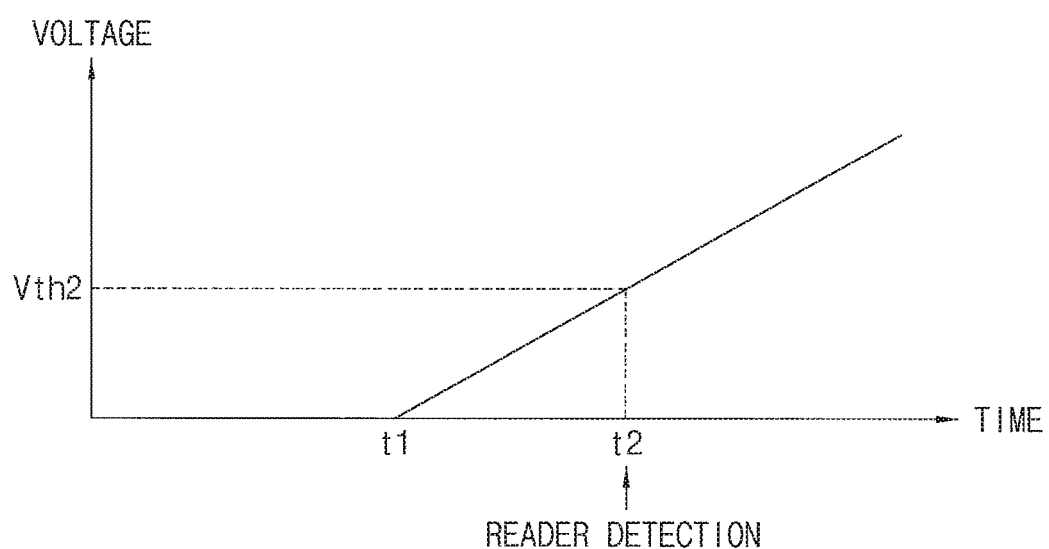
FIG. 3 is a diagram for describing an operation of the contactless communication device of FIG. 1 to detect whether a contactless communication reader is near the contactless communication device.

FIG. 3 is a diagram for describing an operation of the contactless communication device of FIG. 1 detecting whether a contactless communication reader is near the contactless communication device.

In FIG. 3, x-axis represents a time and y-axis represents the antenna voltage VAN generated by the transceiver 100.

As illustrated in FIG. 3, when a contactless communication reader is not near the contactless communication device 10, the transceiver 100 may not receive the electromagnetic wave EMW from outside, such that the antenna voltage VAN generated by the transceiver 100 may be substantially zero.

As the contactless communication device 10 approaches a contactless communication reader, the transceiver 100 may start to receive the electromagnetic wave EMW emitted from the contactless communication reader at a first time t1. After the first time t1, a mutual induction may occur between the transceiver 100 and the contactless communication reader, such that the antenna voltage VAN may be generated by the transceiver 100. A frequency of the antenna voltage VAN generated by the transceiver 100 may be equal to a frequency of the electromagnetic wave EMW emitted from the contactless communication reader.

As a distance between the contactless communication device 10 and the tactless communication reader decreases, the magnitude of the antenna voltage VAN generated by transceiver 100 may increase, such that the magnitude of the antenna voltage VAN may become greater than a second threshold voltage Vth2 at a second time t2.

The contactless communication chip 200 may determine that the contactless communication reader is detected near the contactless communication device 10 when the magnitude of the antenna voltage VAN generated by the transceiver 100 is greater than the second threshold voltage Vth2.

When the contactless communication device 10 detects that the contactless communication reader is near the contactless communication device 10, the contactless communication device 10 may operate in the card mode.

In an initial stage of the card mode, the contactless communication chip 200 may generate a reference clock signal based on the antenna voltage VAN, and adjust the frequency of the internal clock signal, which is generated by the clock generator 210, based on the reference clock signal. For example, the contactless communication chip 200 may adjust the frequency of the internal clock signal such that the frequency of the internal clock signal may be equal to a frequency of the reference clock signal.

In some example embodiments, the contactless communication chip 200 may perform a count operation in synchronization with the internal clock signal during a reference number of cycles of the reference clock signal to generate a count number, and adjust the frequency of the internal clock signal based on a difference between the count number and the reference number. For example, the contactless communication chip 200 may increase the frequency of the internal clock signal when the count number is smaller than the reference number. On the other hand, the contactless communication chip 200 may decrease the frequency of the internal clock signal when the count number is greater than the reference number.

In other example embodiments, the contactless communication chip 200 may perform a measuring operation, which includes performing a count operation in synchronization with the internal clock signal during a reference number of cycles of the reference clock signal to generate a count number, a plurality of times, and adjust the frequency of the internal clock signal based on a difference between an average of the count numbers, which are generated by performing the measuring operation a plurality of times, and the reference number.

Therefore, the frequency of the internal clock signal generated by the clock generator 210 may become equal to the frequency of the electromagnetic wave EMW received from the contactless communication reader.

After that, when the contactless communication device 10 operates in the reader mode, the clock generator 210 may generate the internal clock signal having the adjusted frequency. Therefore, in the reader mode, the contactless communication device 10 may emit the electromagnetic wave EMW having the adjusted frequency.

In some example embodiments, the contactless communication chip 200 may adjust the frequency of the internal clock signal, which is generated by the clock generator 210, based on the frequency of the reference clock signal such that the frequency of the internal clock signal may become a desired frequency for an operation of the contactless communication chip 200. In this case, in the reader mode, the contactless communication chip 200 may convert the frequency of the internal clock signal to the carrier frequency using a frequency conversion circuit to generate a carrier signal.

When a contactless communication chip does not include the clock generator 210, the contactless communication device may be able to operate in the card mode using the reference clock signal, which is generated based on the electromagnetic wave EMW emitted from an external contactless communication reader. However, the contactless communication device may not operate correctly in the reader mode, since the contactless communication device does not receive the electromagnetic wave EMW from outside in the reader mode, and, thus, the contactless communication device may not be able to generate the reference clock signal in the reader mode.

In contrast, as described above, in one or more example embodiments, since the contactless communication chip 200 includes the clock generator 210 generating the internal clock signal, the contactless communication chip 200 may adjust the frequency of the internal clock signal, which is generated by the clock generator 210, using the reference clock signal, which is generated based on the electromagnetic wave EMW emitted from an external contactless communication reader, in the card mode, and operate using the adjusted internal clock signal both in the card mode and in the reader mode. Therefore, the contactless communication device 10 may operate correctly both in the card mode and in the reader mode.

Generally, a frequency of an electromagnetic wave emitted by a contactless communication device is equal to a carrier frequency defined in a communication standard to communicate correctly with an external device. For this reason, a conventional contactless communication device may operate based on an external clock signal having a frequency equal to a carrier frequency defined in a communication standard, or may operate based on an internal clock signal having a frequency equal to the carrier frequency defined in the communication standard.

When a contactless communication device operates based on an external clock signal, the contactless communication device may require a separate pin though which the external clock signal is received from outside. Therefore, a size of the contactless communication device may increase and a separate external clock generator, such as a crystal oscillator, to generate the external clock signal may increase the costs associated with using the contactless communication device.

When a contactless communication device operates based on an internal clock signal, a frequency of the internal clock signal may vary according to temperature, which may make cause the frequency of the internal clock signal to vary from the carrier frequency defined in the communication standard.

On the other hand, the contactless communication device 10 according to example embodiments may adjust the frequency of the internal clock signal, which is generated by the clock generator 210, based on the electromagnetic wave EMW received from the contactless communication reader in the card mode. For example, the contactless communication device 10 may adjust the frequency of the internal clock signal such that the frequency of the internal clock signal becomes equal to the frequency of the electromagnetic wave EMW received from the contactless communication reader in the card mode. In this way, the contactless communication device 10 may adjust the frequency of the internal clock signal when the contactless communication device 10 operates in the card mode. Therefore, the contactless communication device 10 may maintain the frequency of the internal clock signal at a desired frequency regardless of a change of temperature. As such, the contactless communication device 10 according to example embodiments may effectively reduce a communication error although the contactless communication device 10 operates based on the internal clock signal, which is generated internally by the clock generator 210, without receiving a clock signal from outside.

Figure 4:
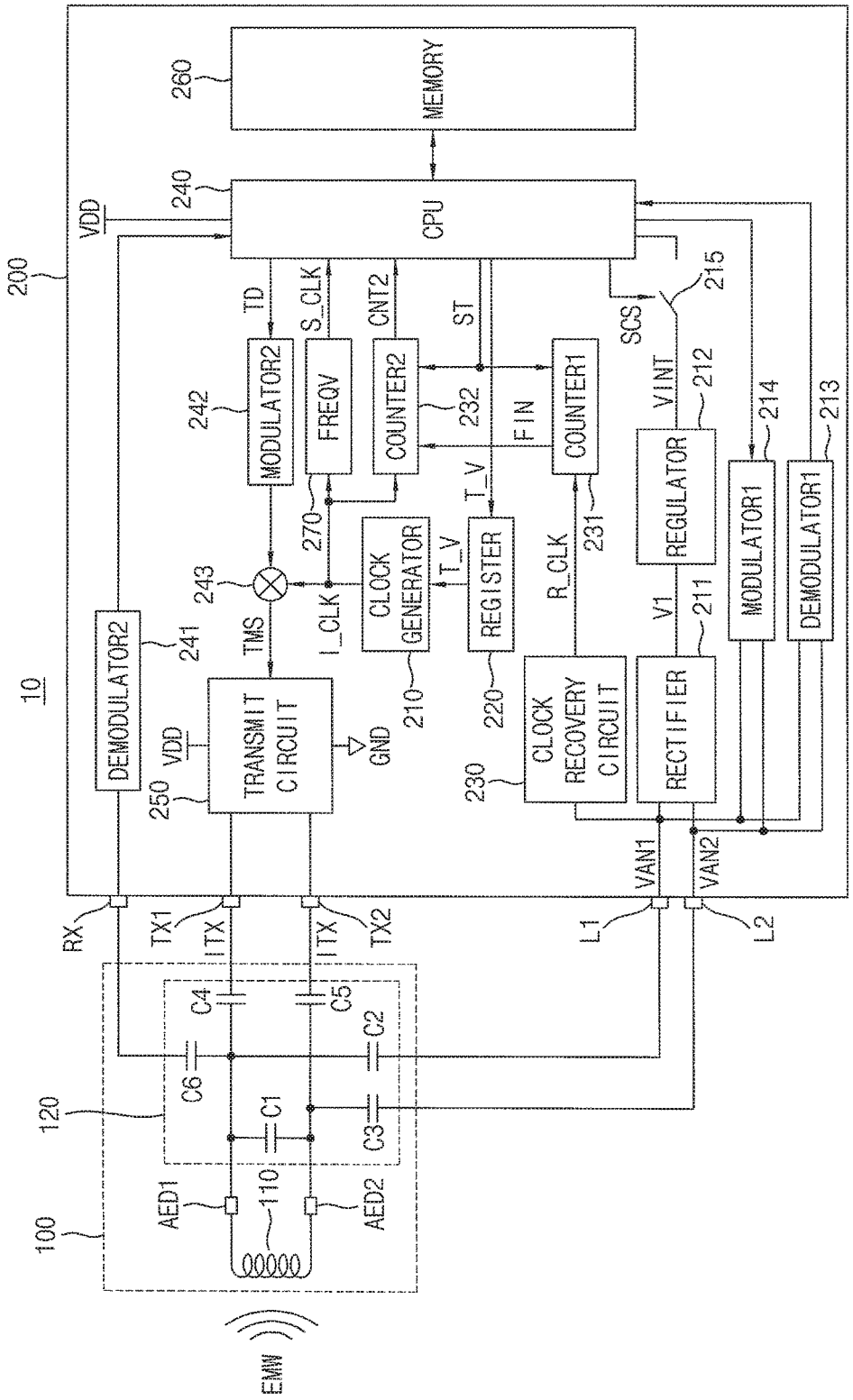
FIG. 4 is a block diagram illustrating an example of the contactless communication device of FIG. 1.

FIG. 4 is a block diagram illustrating an example of the contactless communication device of FIG. 1.

Referring to FIG. 4, the contactless communication device 10 may include a transceiver 100 and a contactless communication chip 200.

The contactless communication chip 200 may be connected to the transceiver 100 through a first power electrode L1, a second power electrode L2, a first transmission electrode TX1, a second transmission electrode TX2, and a reception electrode RX.

The transceiver 100 may include an antenna 110 and a matching circuit 120.

In some example embodiments, the antenna 110 may include a loop coil coupled between a first antenna electrode AED1 and a second antenna electrode AED2.

The matching circuit 120 may be coupled between the antenna 110 and the contactless communication chip 200. For example, the matching circuit 120 may be coupled to the antenna 110 through the first antenna electrode AED1 and the second antenna electrode AED2, and be coupled to the contactless communication chip 200 through the first power electrode L1, the second power electrode L2, the first transmission electrode TX1, the second transmission electrode TX2, and the reception electrode RX. The matching circuit 120 may perform impedance matching between the antenna 110 and the contactless communication chip 200.

In some example embodiments, the matching circuit 120 may include a first capacitor C1, a second capacitor C2, a third capacitor C3, a fourth capacitor C4, a fifth capacitor C5, and a sixth capacitor are C6. However, example embodiments are not limited thereto.

The first capacitor C1 may be coupled between the first antenna electrode AED1 and the second antenna electrode AED2 The first capacitor C1 may form a resonance circuit together with the antenna 110. A resonance frequency of the transceiver 100 may be adjusted to a desired frequency (e.g., 13.56 MHz) by controlling a capacitance of the first capacitor C1. The second capacitor C2 may be coupled between the first antenna electrode AED1 and the first power electrode L1. The third capacitor C3 may be coupled between the second antenna electrode AED2 and the second power electrode L2. The fourth capacitor C4 may be coupled between the first antenna electrode AED1 and the first transmission electrode TX1. The fifth capacitor C5 may be coupled between the second antenna electrode AED2 and the second transmission electrode TX2. The sixth capacitor C6 may be coupled between the first antenna electrode AED1 and the reception electrode RX. According to example embodiments, the sixth capacitor C6 may be coupled between the second antenna electrode AED2 and the reception electrode RX.

When the transceiver 100 receives an electromagnetic wave EMW, which has a frequency corresponding to the resonance frequency of the transceiver 100, from an external contactless communication reader, a mutual induction may occur between the transceiver 100 and the external contactless communication reader. Therefore, an induced voltage may be generated at the first antenna electrode AED1 and the second antenna electrode AED2 to which the antenna 110 is coupled.

The induced voltage generated at the first antenna electrode AED1 may be provided to the first power electrode L1 through the second capacitor C2 as a first antenna voltage VAN1. The induced voltage generated at the second antenna electrode AED2 may be provided to the second power electrode L2 through the third capacitor C3 as a second antenna voltage VAN2.

Figure 5:
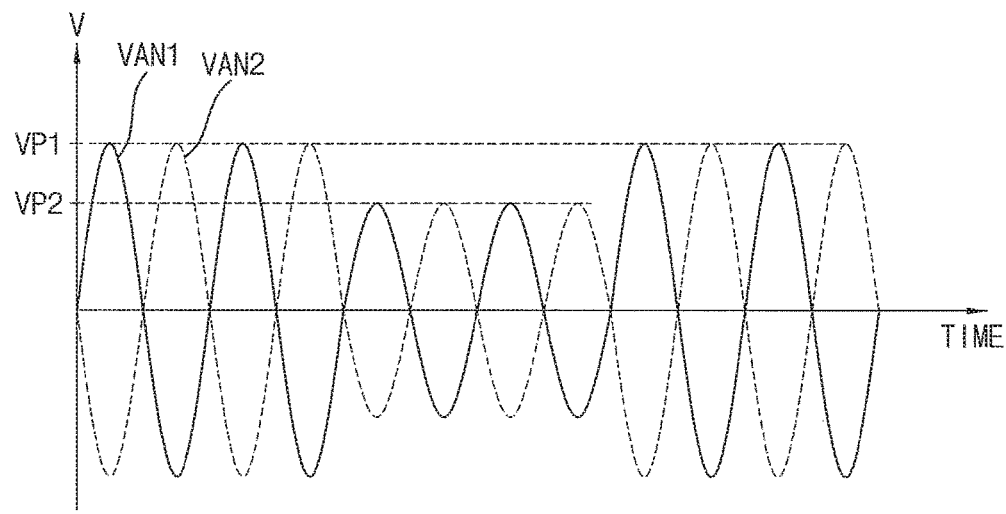
FIGS. 5 and 6 are graphs illustrating a first antenna voltage and a second antenna voltage generated by a transceiver included in the contactless communication device of FIG. 4.
Figure 6:
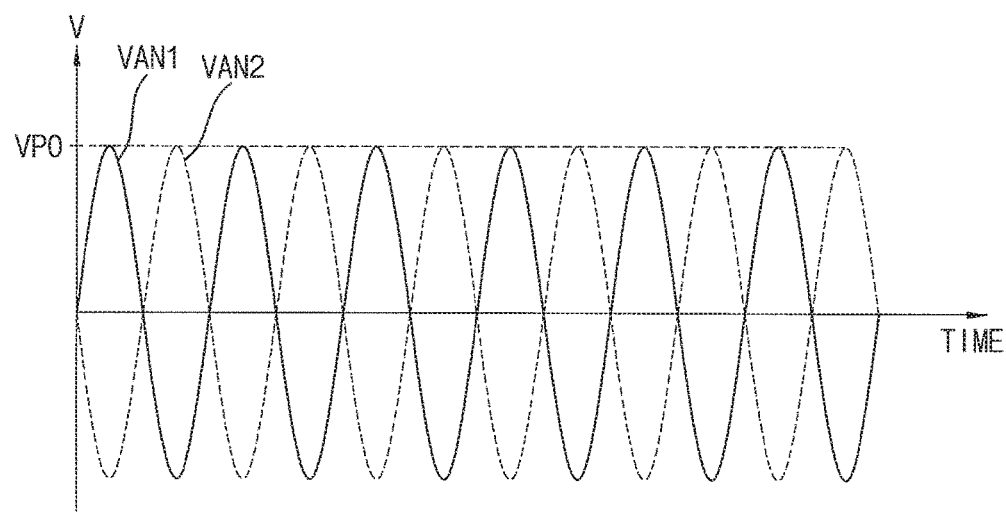

FIGS. 5 and 6 are graphs illustrating a first antenna voltage and a second antenna voltage generated by a transceiver included in the contactless communication device of FIG. 4.

FIG. 5 illustrates the first antenna voltage VAN1 and the second antenna voltage VAN2 generated by the transceiver 100 when the transceiver 100 receives the electromagnetic wave EMW including a modulated carrier signal. FIG. 6 illustrates the first antenna voltage VAN1 and the second antenna voltage VAN2 generated by the transceiver 100 when the transceiver 100 receives the electromagnetic wave EMW including an unmodulated carrier signal.

As described above, the induced voltage may be generated at the first antenna electrode AED1 and the second antenna electrode AED2 by a mutual induction between the transceiver 100 and the external contactless communication reader. Therefore, a magnitude of the induced voltage generated at the first antenna electrode AED1 may be the same as a magnitude of the induced voltage generated at the second antenna electrode AED2, and a phase of the induced voltage generated at the first antenna electrode AED1 may be different from a phase of the induced voltage generated at the second antenna electrode AED2 by 180 degrees.

Since the second capacitor C2 eliminates a DC (direct current) component of the induced voltage generated at the first antenna electrode AED1, the first antenna voltage VAN1 provided to the first power electrode L1 may include only an AC (alternating current) component.

Similarly, since the third capacitor C3 eliminates a DC (direct current) component of the induced voltage generated at the second antenna electrode AED2, the second antenna voltage VAN2 provided to the second power electrode L2 may include only an AC (alternating current) component.

Therefore, as illustrated in FIGS. 5 and 6, a magnitude of the first antenna voltage VAN1 may be the same as a magnitude of the second antenna voltage VAN2, and a phase of the first antenna voltage VAN1 may be different from a phase of the second antenna voltage VAN2 by 180 degree.

In FIGS. 5 and 6, a solid line graph represents the first antenna voltage VAN1, and a dotted line graph represents the second antenna voltage VAN2.

In some example embodiments, the contactless communication device 10 may use an amplitude shift keying (ASK) modulation to communicate data.

Therefore, as illustrated in FIG. 5, when the transceiver 100 receives the electromagnetic wave EMW including a modulated carrier signal, each of the first antenna voltage VAN1 and the second antenna voltage VAN2 may have a first peak voltage VP1 and a second peak voltage VP2 based on modulated data.

On the other hand, as illustrated in FIG. 6, when the transceiver 100 receives the electromagnetic wave EMW including an unmodulated carrier signal, each of the first antenna voltage VAN1 and the second antenna voltage VAN2 may have a constant peak voltage VP0. In this case, each of the first antenna voltage VAN1 and the second antenna voltage VAN2 may correspond to a sine wave having a frequency equal to the frequency of the electromagnetic wave EMW received from the external contactless communication reader.

The matching circuit 120 illustrated in FIG. 4 is only an example. According to example embodiments, the matching circuit 120 may be implemented in various structures to perform impedance matching between the antenna 110 and the contactless communication chip 200.

Referring again to FIG. 4, the contactless communication chip 200 may perform a transmit operation and a receive operation through the first power electrode L1 and the second power electrode L2 in the card mode, perform a transmit operation through the first transmission electrode TX1 and the second transmission electrode TX2 in the reader mode, and perform a receive operation through the reception electrode RX in the reader mode.

The contactless communication chip 200 may provide the output current ITX to the transceiver 100 through the first transmission electrode TX1 and the second transmission electrode TX2, and receive the first antenna voltage VAN1 and the second antenna voltage VAN2 from the transceiver 100 through the first power electrode L1 and the second power electrode L2, respectively.

The contactless communication chip 200 may include a clock generator 210, a rectifier 211, a regulator 212, a first demodulator 213, a first modulator 214, a power switch 215, a register 220, a clock recovery circuit 230, a first counter 231, a second counter 232, a central processing unit (CPU) 240, a second demodulator 241, a second modulator 242, a mixer 243, a transmit circuit 250, a memory 260, and a frequency conversion circuit FREQV 270.

The rectifier 211 may generate a first voltage V1, which is a direct voltage, by rectifying the first antenna voltage VAN1 and the second antenna voltage VAN2 provided from the transceiver 100 through the first power electrode L1 and the second power electrode L2.

The regulator 212 may generate an internal voltage VINT, which has a voltage level of a desired (or, alternatively, a predetermined) magnitude usable in the contactless communication chip 200, using the first voltage V1.

The CPU 240 may include at least one processor implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to control the overall operation of the contactless communication chip 200. For example, the processor may be programed with instructions that configure the processor to adjust the frequency of an internal clock signal to have a same frequency as an electromagnetic wave EMW received from a contactless communication reader in the card mode. Therefore, the processor may improve the functioning of the contactless communication device 10 itself by maintaining the frequency of the internal clock signal at a desired frequency regardless of a change of temperature, without receiving a clock signal from outside.

The CPU 240 may operate using a supply voltage VDD provided from a power source, such as a battery. In addition, the CPU 240 may receive the internal voltage VINT from the regulator 212 through the power switch 215. When the supply voltage VDD is equal to or higher than a desired (or, alternatively, a predetermined) voltage level, the CPU 240 may operate using the supply voltage VDD and disable a switch control signal SCS to turn off the power switch 215. When the supply voltage VDD is lower than the predetermined voltage level, the CPU 240 may enable the switch control signal SCS to turn on the power switch 215 such that the CPU 240 may operate using the internal voltage VINT provided from the regulator 212.

The clock generator 210 may generate an internal clock signal I_CLK.

In some example embodiments, a frequency of the internal clock signal I_CLK y correspond to a carrier frequency defined in the communication standard. For example, when the contactless communication device 10 is an NFC device, the frequency of the internal clock signal I_CLK generated by the clock generator 210 may correspond to 13.56 MHz.

The frequency conversion circuit 270 may convert the frequency of the internal clock signal I_CLK to generate a system clock signal S_CLK, and provide the system clock signal S_CLK to the CPU 240. The CPU 240 may operate in synchronization with the system clock signal S_CLK.

In some example embodiments, the frequency conversion circuit 270 may include a frequency multiplier. In this case, the frequency conversion circuit 270 may generate the system clock signal S_CLK by increasing the frequency of the internal clock signal I_CLK. For example, when the frequency of the internal clock signal I_CLK corresponds to 13.56 MHz, the frequency conversion circuit 270 may generate the system clock signal S_CLK having a frequency of 27.12 MHz by doubling the frequency of the internal clock signal I_CLK.

In other example embodiments, the frequency conversion circuit 270 may generate the system clock signal S_CLK by changing the frequency of the internal clock signal I_CLK to any frequency required for an operation of the CPU 240.

In still other example embodiments, the contactless communication chip 200 may not include the frequency conversion circuit 270. In this case, the CPU 240 may receive the internal clock signal I_CLK from the clock generator 210 and operate in synchronization with the internal clock signal I_CLK.

In some example embodiments, the clock generator 210 may generate the internal clock signal I_CLK having a frequency determined based on a trimming value T_V stored in the register 220.

Figure 7:
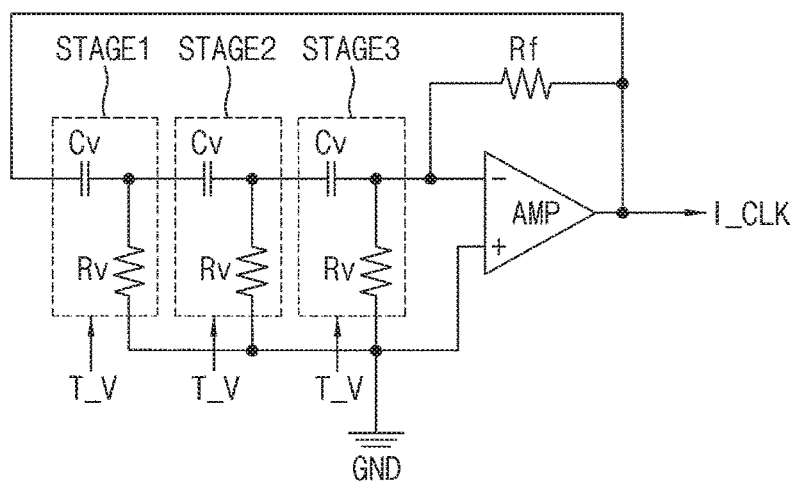
FIG. 7 is a circuit diagram illustrating an example of a clock generator included in a contactless communication chip of FIG. 4.

FIG. 7 is a circuit diagram illustrating an example of a clock generator included in a contactless communication chip of FIG. 4.

Referring to FIG. 7, the clock generator 210 may be implemented with a resistor-capacitor (RC) oscillator.

For example, the clock generator 210 may include a plurality of stages STAGE1, STAGE2, and STAGE3 coupled in series, an amplifier AMP, and a feedback resistor Rf. Each of the plurality of stages STAGE1, STAGE2, and STAGE3 may include a resistor Rv and a capacitor Cv.

A phase shift of an input signal caused by the plurality of stages STAGE1, STAGE2, and STAGE3 may correspond to 180 degree.

In FIG. 7, the clock generator 210 is illustrated to include three stages STAGE1, STAGE2, and STAGE3 as an example. In this case, a phase shift caused by each of the plurality of stages STAGE1, STAGE2, and STAGE3 may correspond to 60 degree.

Therefore, a phase difference between an input signal of the amplifier AMP and an output signal of the amplifier AMP may correspond to 180 degree. As such, the clock generator 210 may generate the internal clock signal I_CLK having a frequency determined based on a resistance of the resistor Rv and a capacitance of the capacitor Cv.

In some example embodiments, the resistor Rv included in each of the plurality of stages STAGE1, STAGE2, and STAGE3 may have a resistance which is varied based on the trimming value T_V stored in the register 220.

In other example embodiments, the capacitor Cv included in each of the plurality of stages STAGE1, STAGE2, and STAGE3 may have a capacitance which is varied based on the trimming value T_V stored in the register 220.

In still other example embodiments, the resistor Rv and the capacitor Cv included in each of the plurality of stages STAGE1, STAGE2, and STAGE3 may have a resistance and a capacitance which are varied based on the trimming value T_V stored in the register 220, respectively.

Therefore, the frequency of the internal clock signal I_CLK generated by the clock generator 210 may be determined based on the trimming value T_V stored in the register 220.

As will be described later, the CPU 240 may adjust the frequency of the internal clock signal I_CLK, which is generated by the clock generator 210, by adjusting the trimming value T_V stored in the register 220 based on a frequency of the first antenna voltage VAN1, which is provided by the transceiver 100, in the card mode.

The clock generator 210 illustrated in FIG. 7 is only an example. According to example embodiments, the clock generator 210 may be implemented in various structures to generate the internal clock signal I_CLK having a frequency determined based on the trimming value T_V stored in the register 220.

As described above with reference to FIGS. 1 to 4, the CPU 240 may perform an operation of detecting whether a contactless communication reader is near the contactless communication device 10, and/or an operation of detecting whether a contactless communication card is near the contactless communication device 10.

When the CPU 240 detects a contactless communication reader near the contactless communication device 10, the contactless communication device 10 may operate in the card mode.

According to a communication standard, in an initial stage of a communication between a reader and a card, the reader provides an unmodulated carrier signal to the card during a guard time, and the card finishes a preparation operation for operating in a card mode by the end of the guard time. The reader transmits a request signal to the card after the guard time, and the card transmits a response signal to the reader in response to the request signal, such that a data communication between the reader and the card is started.

For example, according to an NFC standard, the guard time of an NFC-A technology and an NFC-B technology corresponds to 5 ms, and the guard time of an NFC-F technology corresponds to 20 ms.

Therefore, in an initial stage of the card mode, the contactless communication device 10 may receive an unmodulated carrier signal from the contactless communication reader during the guard time.

Therefore, as described above with reference to FIG. 6, each of the first antenna voltage VAN1 and the second antenna voltage VAN2 generated by the transceiver 100 during the guard time may correspond to a sine wave having a frequency equal to the frequency of the electromagnetic wave EMW received from the contactless communication reader.

The clock recovery circuit 230 may be coupled to one of the first power electrode L1 and the second power electrode L2. In FIG. 4, the clock recovery circuit 230 is illustrated to be coupled to the first power electrode L1 as an example.

The clock recovery circuit 230 may receive the first antenna voltage VAN1 from the transceiver 100 through the first power electrode L1.

The clock recovery circuit 230 may generate the reference clock signal R_CLK having a same frequency as the first antenna voltage VAN1 based on the first antenna voltage VAN1 received from the transceiver 100 during the guard time. For example, the clock recovery circuit 230 may generate the reference clock signal R_CLK by converting a sine wave, which corresponds to the first antenna voltage VAN1, to a square wave.

Figures 8, 9:
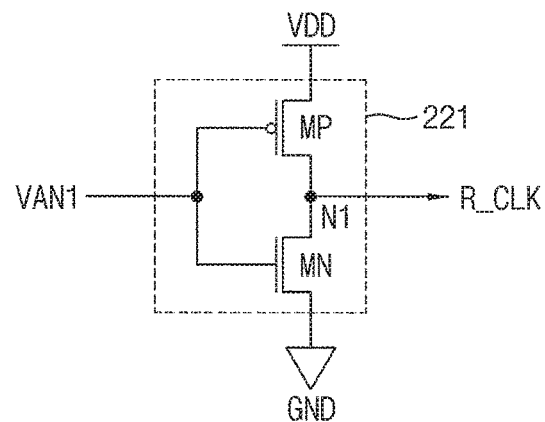
FIG. 8 is a circuit diagram illustrating an example of a clock recovery circuit included in a contactless communication chip of FIG. 4.
FIG. 9 is a diagram illustrating an example of a lookup table included in a central processing unit (CPU) of FIG. 4.

FIG. 8 is a circuit diagram illustrating an example of a clock recovery circuit included in a contactless communication chip of FIG. 4.

Referring to FIG. 8, the clock recovery circuit 230 may include an inverter 221.

The inverter 221 may include a p-type metal oxide semiconductor (PMOS) transistor MP and an n-type metal oxide semiconductor (NMOS) transistor MN. The PMOS transistor MP may be coupled between the supply voltage VDD and an output electrode NE and include a gate receiving the first antenna voltage VAN1 through the first power electrode L1. The NMOS transistor MN may be coupled between a ground voltage GND and the output electrode N1, and include a gate receiving the first antenna voltage VAN1 through the first power electrode L1.

The inverter 221 may output the reference clock signal R_CLK through the output electrode N1 by inverting the first antenna voltage VAN1.

As a gain of the inverter 221 increases, the reference clock signal R_CLK generated by the inverter 221 may be closer to a square wave.

Although the clock recovery circuit 230 is illustrated to include one inverter 221 in FIG. 8, the clock recovery circuit 230 may include a plurality of inverters coupled in series according to example embodiments.

In addition, the clock recovery circuit 230 illustrated in FIG. 8 is only an example. According to example embodiments, the clock recovery circuit 230 may be implemented in various structures to convert a sine wave to a square wave.

As described above, since the first antenna voltage VAN1 provided from the transceiver 100 to the clock recovery circuit 230 through the first power electrode L1 during the guard time corresponds to a sine wave having a frequency equal to the frequency of the electromagnetic wave EMW received from the contactless communication reader, the frequency of the reference clock signal R_CLK generated by the clock recovery circuit 230 may be the same as the frequency of the electromagnetic wave EMW received from the contactless communication reader.

In addition, when the CPU 240 detects the contactless communication reader near the contactless communication device 10, the CPU 240 may provide a start signal ST to the first counter 231 and the second counter 232 at the same time at an initial stage of the guard time.

When the first counter 231 receives the start signal ST from the CPU 240, the first counter 231 may perform a count operation in synchronization with the reference clock signal R_CLK to generate a first count number. For example, when the first counter 231 receives the start signal ST from the CPU 240, the first counter 231 may reset the first count number and perform a count operation in synchronization with the reference clock signal R_CLK to generate the first count number.

When the first count number becomes equal to the reference number, the first counter 231 may output a finish signal FIN. In some example embodiments, the reference number may be stored in the first counter 231.

Therefore, the first counter 231 may output the finish signal FIN after the reference number of cycles of the reference clock signal R_CLK from a time at which the start signal ST is received from the CPU 240.

In some example embodiments, a value generated by multiplying a period of the reference clock signal R_CLK with the reference number may be smaller than the guard time defined in a communication standard. For example, since a period of a carrier signal is defined in a communication standard, the reference number may be determined such that a value generated by multiplying the period of the carrier signal with the reference number is smaller than the guard time.

Therefore, the first counter 231 may output the finish signal FIN before the end of the guard time.

When the second counter 232 receives the start signal ST from the CPU 240, the second counter 232 may perform a count operation in synchronization with the internal clock signal I_CLK to generate a second count number CNT2. For example, when the second counter 232 receives the start signal ST from the CPU 240, the second counter 232 may reset the second count number CNT2 and perform a count operation in synchronization with the internal clock signal I_CLK to generate the second count number CNT2.

When the second counter 232 receives the finish signal FIN from the first counter 231, the second counter 232 may stop performing the count operation and provide the second count number CNT2 to the CPU 240.

As described above, a time period between a time at which the second counter 232 receives the start signal ST from the CPU 240 and a time at which the second counter 232 receives the finish signal FIN from the first counter 231 may correspond to the reference number of cycles of the reference clock signal R_CLK. Therefore, the second count number CNT2 provided from the second counter 232 to the CPU 240 may represent a number of cycles of the internal clock signal I_CLK included in the reference number of cycles of the reference clock signal R_CLK.

The CPU 240 may adjust the frequency of the internal clock signal I_CLK, which is generated by the clock generator 210, by adjusting the trimming value T_V stored in the register 220 based on the second count number CNT2 and the reference number.

For example, when the second count number CNT2 is smaller than the reference number, the CPU 240 may adjust the trimming value T_V stored in the register 220 such that the frequency of the internal clock signal I_CLK is increased. On the other hand, when the second count number CNT2 is greater than the reference number, the CPU 240 may adjust the trimming value T_V stored in the register 220 such that the frequency of the internal clock signal I_CLK is decreased. Therefore, the frequency of the internal clock signal I_CLK generated by the clock generator 210 may be adjusted to be equal to the frequency of the electromagnetic wave EMW received from the contactless communication reader in the card mode.

In some example embodiments, the CPU 240 may include a lookup table LT storing optimum trimming values in relation with differences between the second count number CNT2 and the reference number.

FIG. 9 is a diagram illustrating an example of a lookup table included in a CPU of FIG. 4.

Referring to FIG. 9, the lookup table LT may store the trimming value T_V in relation with a difference between the second count number CNT2 and the reference number REFV.

For example, as illustrated in FIG. 9, the lookup table LT may store desired (or, alternatively, optimum) trimming values tv(−n)~tv(n) for the cases in which differences between the second count number CNT2 and the reference number REFV are from −n to n, respectively. Here, n represents a positive integer.

When the CPU 240 receives the second count number CNT2 from the second counter 232, the CPU 240 may read an optimum trimming value corresponding to the difference between the second count number CNT2 and the reference number REFV from the lookup table LT, and store the read optimum trimming value in the register 220 as the trimming value T_V.

In some example embodiments, in an initial stage of the card mode, the CPU 240 may perform a measuring operation, which includes providing the start signal ST to the first counter 231 and the second counter 232 at the same time and receiving the second count number CNT2 from the second counter 232, a plurality of times until the guard time is finished. In this case, the CPU 240 may adjust the frequency of the internal clock signal I_CLK, which is generated by the clock generator 210, by adjusting the trimming value T_V stored in the register 220 based on an average of the second count numbers CNT2, which are received from the second counter 232 while performing the measuring operation a plurality of times, and the reference number REFV. Therefore, the frequency of the internal clock signal I_CLK generated by the clock generator 210 may be more correctly adjusted to be equal to the frequency of the electromagnetic wave EMW received from the contactless communication reader in the card mode.

As described above, when the contactless communication chip 200 detects the contactless communication reader near the contactless communication device 10, the contactless communication chip 200 may adjust the frequency of the internal clock signal I_CLK during the guard time, and then operate in the card mode.

When the contactless communication chip 200 performs the receive operation in the card mode, the first demodulator 213 may generate input data by demodulating a signal provided from the transceiver 100 through the first power electrode L1 and the second power electrode L2, and provide the input data to the CPU 240. The CPU 240 may store the input data in the memory 260.

When the contactless communication chip 200 performs the transmit operation in the card mode, the CPU 240 may read output data from the memory 260 and provide the output data to the first modulator 214, and the first modulator 214 may modulate the output data and provide a modulation signal to the first power electrode L1 and the second power electrode L2. For instance, the first modulator 214 may generate the modulation signal by performing a load modulation on the output data.

As described above with reference to FIGS. 1 to 4, the CPU 240 may perform an operation of detecting whether a contactless communication reader is near the contactless communication device 10, and/or an operation of detecting whether a contactless communication card is near the contactless communication device 10.

When the CPU 240 detects a contactless communication card near the contactless communication device 10, the contactless communication device 10 may operate in the reader mode.

In the reader mode, the clock generator 210 may generate the internal clock signal I_CLK having a frequency determined based on the trimming value T_V, which is adjusted in the card mode that is performed just before, and the contactless communication chip 200 may communicate with the contactless communication card using the internal clock signal I_CLK.

When the contactless communication chip 200 performs the receive operation in the reader mode, the second demodulator 241 may generate input data by demodulating a signal provided from the transceiver 100 through the reception electrode RX, and provide the input data to the CPU 240. The CPU 240 may store the input data in the memory 260.

When the contactless communication chip 200 performs the transmit operation in the reader mode, the CPU 240 may read output data TD from the memory 260 and provide the output data TB to the second modulator 242, the second modulator 242 may modulate the output data TD to generate a modulation signal, and the mixer 243 may generate a transmission modulation signal TMS by synthesizing the internal clock signal I_CLK, which has a carrier frequency, with the modulation signal.

The transmit circuit 250 may be coupled between the supply voltage VDD and the ground voltage GND.

In the reader mode, the transmit circuit 250 may provide the output current ITX, which corresponds to the transmission modulation signal TMS received from the mixer 243, to the transceiver 100 through the first transmission electrode TX1 and the second transmission electrode TX2, and the transceiver 100 may emit the electromagnetic wave EMW corresponding to the output current ITX.

In some example embodiments, in the reader mode, the transmit circuit 250 may provide the output current ITX corresponding to the transmission modulation signal TMS to the transceiver 100 through the first transmission electrode TX1 and the second transmission electrode TX2 by connecting the first transmission electrode TX1 and the second transmission electrode TX2 to the supply voltage VDD through a pull-up load or to the ground voltage GND through a pull-down load based on the transmission modulation signal TMS.

For example, in the reader mode, the transmit circuit 250 may connect the first transmission electrode TX1 to the supply voltage VDD through the pull-up load and connect the second transmission electrode TX2 to the ground voltage GND through the pull-down load, or connect the first transmission electrode TX1 to the ground voltage GND through the pull-down load and connect the second transmission electrode TX2 to the supply voltage VDD through the pull-up load based on the transmission modulation signal TMS to provide the output current ITX corresponding to the transmission modulation signal TMS to the transceiver 100 through the first transmission electrode TX1 and the second transmission electrode TX2.

When the transmit circuit 250 connects the first transmission electrode TX1 to the supply voltage VDD through the pull-up load and connects the second transmission electrode TX2 to the ground voltage GND through the pull-down load, the output current ITX may be generated from the supply voltage VDD, be provided to the transceiver 100 through the first transmission electrode TX1 and be sunk to the ground voltage GND through the second transmission electrode TX2.

When the transmit circuit 250 connects the first transmission electrode TX1 to the ground voltage GNU through the pull-down load and connects the second transmission electrode TX2 to the supply voltage VDD through the pull-up load, the output current ITX may be generated from the supply voltage VDD, be provided to the transceiver 100 through the second transmission electrode TX2 and be sunk to the ground voltage GND through the first transmission electrode TX1.

During a period of detecting whether a contactless communication card is near the contactless communication device 10, the CPU 240 may not provide the output data ID to the second modulator 242. Therefore, as described above with reference to FIG. 2, the output current ITX, which is provided from the transmit circuit 250 to the transceiver 100 through the first transmission electrode TX1 and the second transmission electrode TX2 during the period of detecting whether a contactless communication card is near the contactless communication device 10, may correspond to an unmodulated carrier signal.

Figure 10:
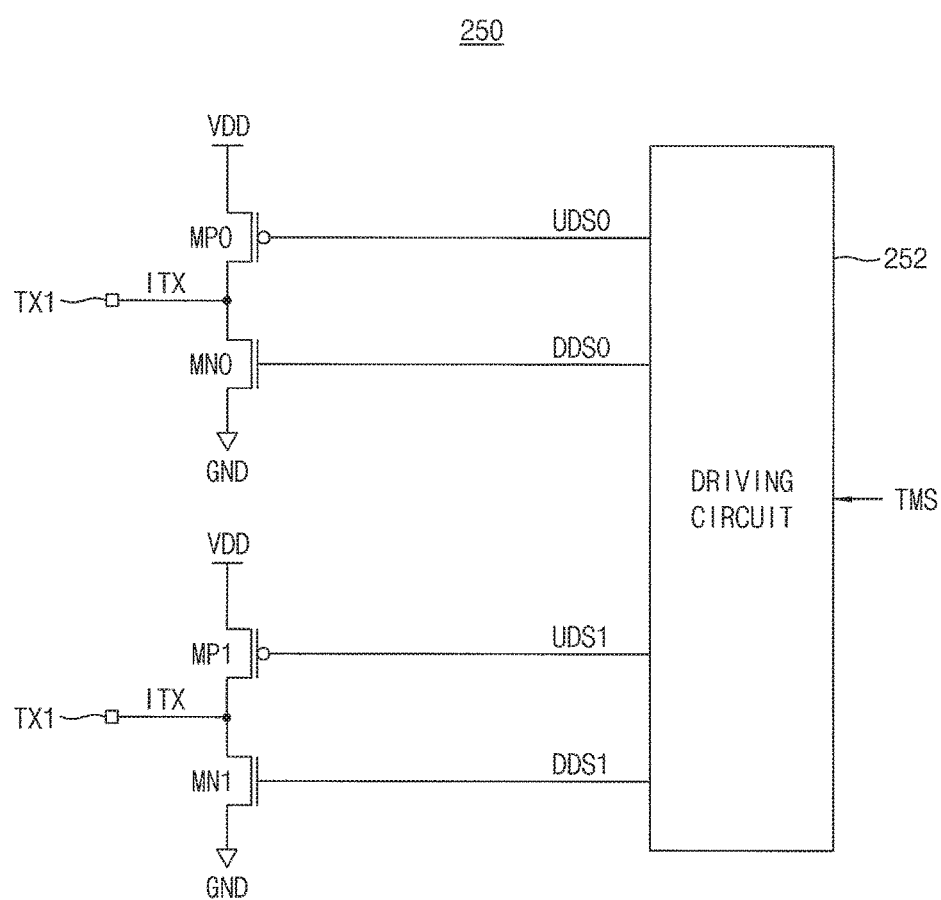
FIG. 10 is a block diagram illustrating an example of a transmit circuit included in a contactless communication chip of FIG. 4.

FIG. 10 is a block diagram illustrating an example of a transmit circuit included in a contactless communication chip of FIG. 4.

Referring to FIG. 10, the transmit circuit 250 may include a first pull-up transistor MP0, a second pull-up transistor MP1, a first pull-down transistor MN0, a second pull-down transistor MN1, and a driving circuit 252.

The first pull-up transistor MP0 and the second pull-up transistor MP1 may be PMOS transistors. The first pull-down transistor MN0 and the second pull-down transistor MN1 may be NMOS transistors.

The first pull-up transistor MP0 may be coupled between the supply voltage VDD and the first transmission electrode TX1, and the first pull-down transistor MN0 may be coupled between the first transmission electrode TX1 and the ground voltage GNU.

The second pull-up transistor MP1 may be coupled between the supply voltage VDD and the second transmission electrode TX2, and the second pull-down transistor MN1 may be coupled between the second transmission electrode TX2 and the ground voltage GNU.

The driving circuit 252 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving circuit 252 may turn on one of the first pull-up transistor MP0 and the first pull-down transistor MN0 and turn on one of the second pull-up transistor MP1 and the second pull-down transistor MN1 based on the transmission modulation signal TMS.

For example, the driving circuit 252 may turn on the first pull-up transistor MP0 and the second pull-down transistor MN1 and turn off the second pull-up transistor MP1 and the first pull-down transistor MN0, or turn on the second pull-up transistor MP1 and the first pull-down transistor MN0 and turn off the first pull-up transistor MP0 and the second pull-down transistor MN1 based on the transmission modulation signal TMS to provide the output current ITX corresponding to the transmission modulation signal TMS to the transceiver 100 through the first transmission electrode TX1 and the second transmission electrode TX2.

As described above with reference to FIGS. 1 to 10, whenever the contactless communication device 10 operates in the card mode, the contactless communication device 10 may adjust the frequency of the internal clock signal I_CLK generated by the clock generator 210 such that the frequency of the internal clock signal I_CLK becomes equal to the frequency of the electromagnetic wave EMW received from the contactless communication reader. Therefore, the contactless communication device 10 may operate using the internal clock signal I_CLK, which has a frequency equal to a carrier frequency defined in a communication standard, in the reader mode regardless of a change of temperature. As such, the contactless communication device 10 according to example embodiments may effectively reduce a communication error although the contactless communication device 10 operates based on the internal clock signal I_CLK, which is generated internally by the clock generator 210, without receiving a clock signal from outside.

Figure 11:
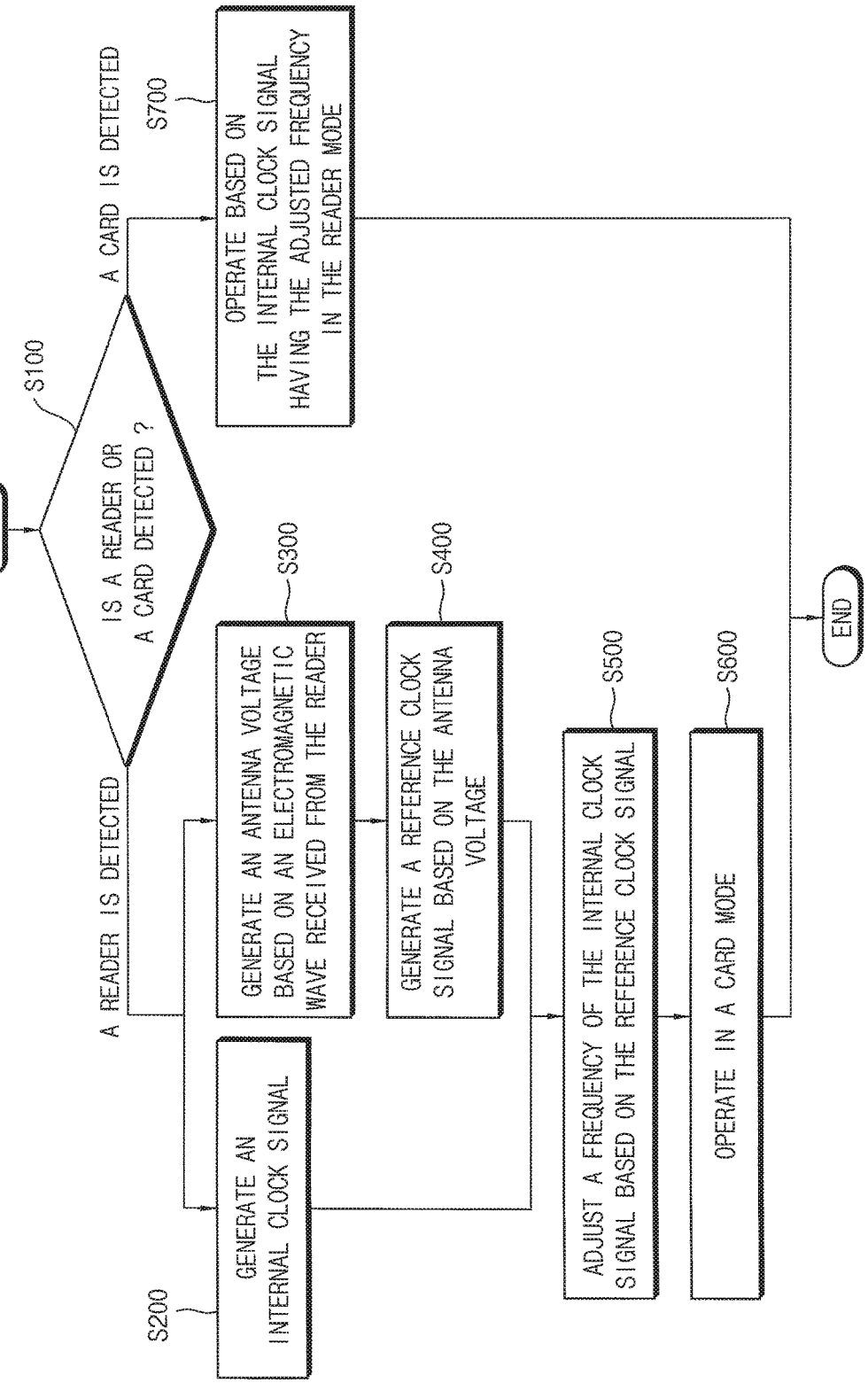
FIG. 11 is a flow chart illustrating a method of operating a contactless communication device according to example embodiments.

FIG. 11 is a flow chart illustrating a method of operating a contactless communication device according to example embodiments.

The method of operating a contactless communication device of FIG. 11 may be performed by the contactless communication device 10 of FIG. 1.

Hereinafter, a method of operating the contactless communication device 10 will be described with reference to FIGS. 1 to 11.

Referring to FIG. 11, in operation S100, the contactless communication device 10 may perform an operation of detecting whether a contactless communication reader is near the contactless communication device 10 and/or an operation of detecting whether a contactless communication card is near the contactless communication device 10.

When the contactless communication device 10 detects a contactless communication reader near the contactless communication device 10, the contactless communication device 10 may perform operations S200 to S600.

In operation S200, the contactless communication device 10 may generate the internal clock signal I_CLK.

In operation S300, the contactless communication device 10 may generate the antenna voltage VAN based on the electromagnetic wave EMW received from the contactless communication reader. The contactless communication device 10 may perform operations S200 and S300 simultaneously when the contactless communication device 10 detects a contactless communication reader near the contactless communication device 10.

In operation S400, the contactless communication device 10 may generate the reference clock signal R_CLK based on the antenna voltage VAN.

In operation S500, the contactless communication device 10 may adjust the frequency of the internal clock signal I_CLK based on the reference clock signal R_CLK.

Figure 12:
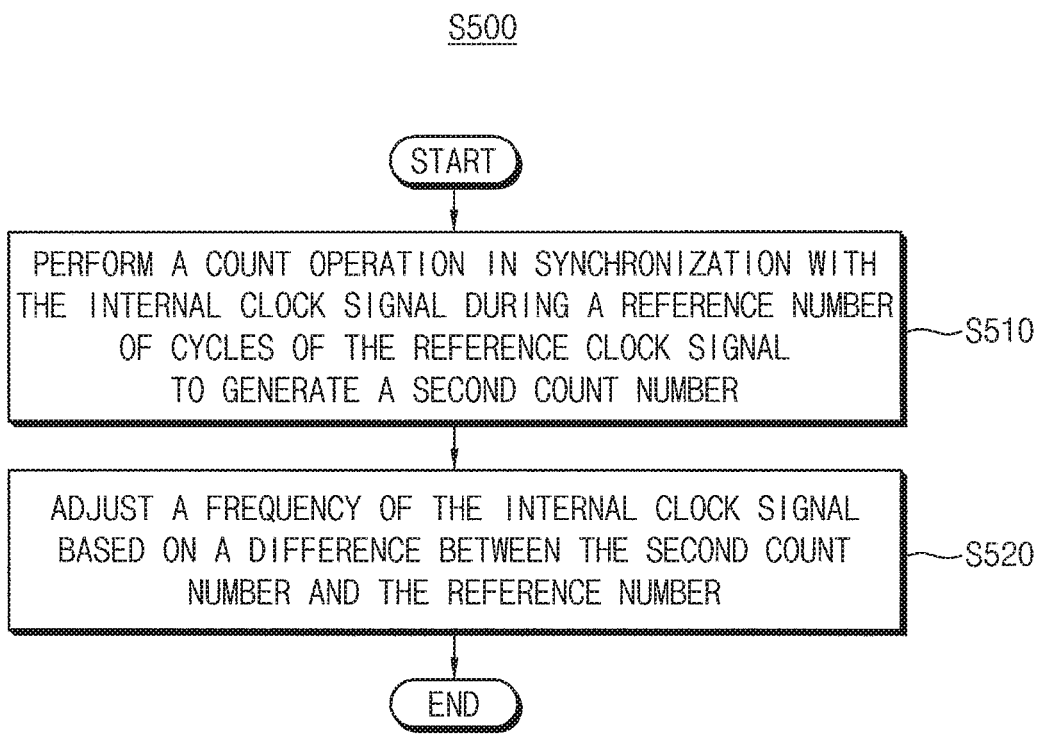
FIG. 12 is a flow chart illustrating an example of a process of adjusting a frequency of an internal clock signal based on a reference clock signal of FIG. 11.

FIG. 12 is a flow chart illustrating an example of a process of adjusting a frequency of an internal clock signal based on a reference clock signal of FIG. 11.

Referring to FIGS. 11 and 12, when performing operation S500 to adjust the frequency of the internal clock signal I_CLK based on the reference clock signal R_CLK, the contactless communication device 10 may perform operations S510 and S520.

In operation S510, the contactless communication device 10 may perform a count operation in synchronization with the internal clock signal I_CLK during the reference number of cycles of the reference dock signal R_CLK to generate the second count number CNT2.

In operation S520, the contactless communication device 10 may adjust the frequency of the internal clock signal I_CLK based on a difference between the second count number CNT2 and the reference number.

For example, the contactless communication device 10 may increase the frequency of the internal clock signal I_CLK when the second count number CNT2 is smaller than the reference number. On the other hand, the contactless communication device 10 may decrease the frequency of the internal clock signal I_CLK when the second count number CNT2 is greater than the reference number.

Referring again to FIG. 11, after the contactless communication device 10 adjusts the frequency of the internal clock signal I_CLK in operation S500, in operation S600, the contactless communication device 10 may operate in the card mode.

Subsequently, the contactless communication device 10 may re-perform operation S100 to detect whether a card is near the contactless communication device 10.

When the contactless communication device 10 detects a contactless communication card near the contactless communication device 10 in operation S100, the contactless communication device 10 may perform operation S700 to generate and/or utilize the internal clock signal I_CLK having the adjusted frequency, and operate based on the internal clock signal I_CLK having the adjusted frequency in the reader mode.

A structure and an operation of the contactless communication device 10 of FIG. 1 are described above with reference to FIGS. 1 to 10. Therefore, detailed description of the steps of FIGS. 11 and 12 will be omitted.

Figure 13:
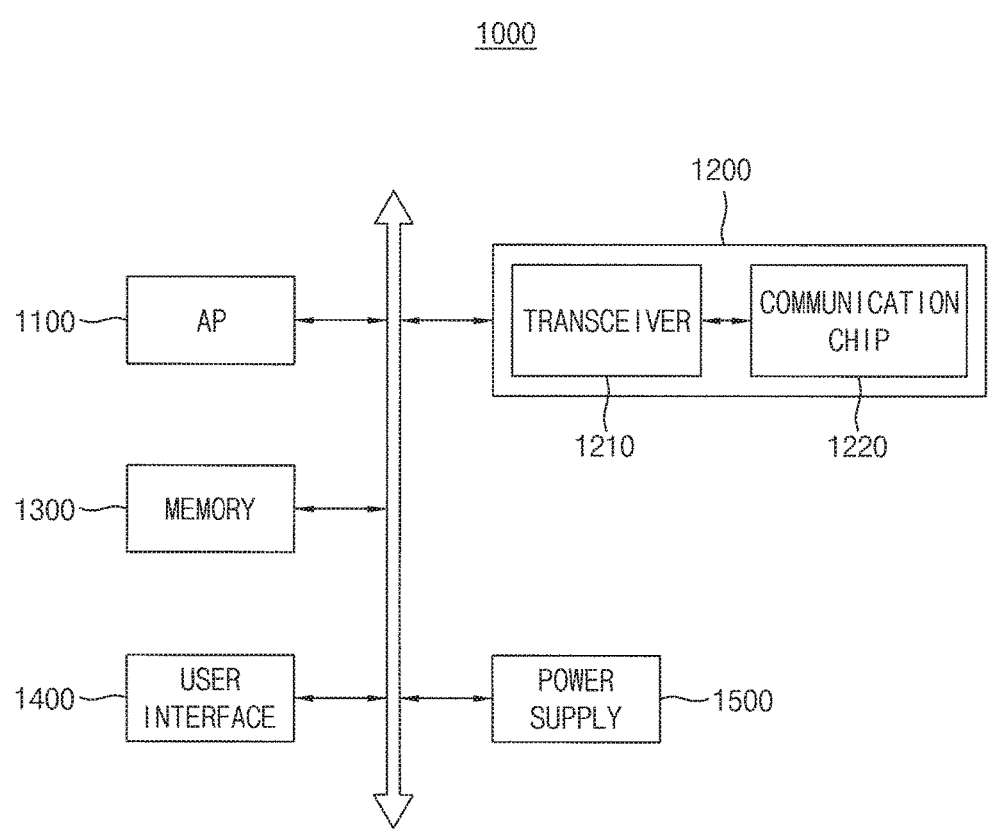
FIG. 13 is a block diagram illustrating an electronic system according to an example embodiment.

FIG. 13 is a block diagram illustrating an electronic system according to an example embodiment.

Referring to FIG. 13, an electronic system 1000 may include an application processor AP 1100, a contactless communication device 1200, a memory device 1300, a user interface 1400, and a power supply 1500. In some example embodiments, the electronic system 1000 may be a mobile system, such as a mobile phone, a smart phone, a personal digital assistant (PDA), a portable multimedia player (PMP), a digital camera, a camcorder, a music player, a portable game console, a navigation system, etc.

The application processor 1100 controls overall operations of the electronic system 1000. The application processor 1100 may execute applications, such as a web browser, a game application, a video player, etc. In some embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store a boot image for booting the electronic system 1000, output data to be outputted to an external device, and input data received from the external device. In some example embodiments, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The contactless communication device 1200 transmits the output data stored in the memory device 1300 to the external device through an electromagnetic wave. The contactless communication device 1200 receives the input data from the external device through an electromagnetic wave and stores the input data in the memory device 1300. In some example embodiments, the contactless communication device 10 may communicate with the external device through an NFC scheme.

The contactless communication device 1200 includes a transceiver 1210 and a contactless communication chip 1220. The contactless communication chip 1220 may operate based on an internal clock signal which is generated internally. In a card mode, the transceiver 1210 may generate an antenna voltage based on an electromagnetic wave received from the external device, and the contactless communication chip 1220 may generate a reference clock signal based on the antenna voltage and adjust a frequency of the internal clock signal based on the reference clock signal. In a reader mode, the contactless communication chip 1220 may communicate with the external device using the internal clock signal having an adjusted frequency.

The contactless communication device 1200 may be implemented with the contactless communication device 10 of FIG. 1. A structure and an operation of the contactless communication device 10 of FIG. 1 are described above with reference to FIGS. 1 to 12. Therefore, detailed description of the contactless communication device 1200 will be omitted.

The user interface 1400 may include at least one input device, such as a keypad, a touch screen, etc., and at least one output device, such as a speaker, a display device, etc. The power supply 1500 may supply a power supply voltage to the electronic system 1000.

In some example embodiments, the electronic system 1000 may further include an image processor, and/or a storage device, such as a memory card, a solid state drive (SSD), etc.

In some example embodiments, the electronic system 1000 and/or components of the electronic system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOW), shrink small outline package (SSOP), thin small outline package (TSOP), system in package (SIP), multi chip package (MCP), wafer-level fabricated package (WFP), or wafer-level processed stack package (WSP).

The foregoing is illustrative of the example embodiments of the inventive concepts and is not to be construed as limiting thereof. Although a few example embodiments have been described, those skilled in the art will readily appreciate that many modifications are possible in the example embodiments without materially departing from the novel teachings and advantages of the example embodiments of the inventive concepts. Accordingly, all such modifications are intended to be included within the scope of the example embodiments of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A contactless communication device, comprising:
   a transceiver configured to generate an antenna voltage based on a first electromagnetic wave received from a contactless communication reader; and
   a contactless communication chip configured to,
   generate a reference clock signal based on the antenna voltage, when the contactless communication chip operates in a card mode in response to a magnitude of the antenna voltage increasing to a card mode threshold,
   adjust, while operating in the card mode, a trimming value stored in a register, a frequency of an internal clock signal being adjusted based on the trimming value,
   generate the internal clock signal based on the trimming value such that a frequency of the internal clock signal is same as a frequency of the first electromagnetic wave, when the contactless communication chip switches from the card mode to a reader mode in response to the magnitude of the antenna voltage decreasing to a reader mode threshold, and
   communicate, while the contactless communication chip operates in the reader mode, with a contactless communication card by emitting, via the transceiver, a second electromagnetic wave based on the internal clock signal.

2. The contactless communication device of claim 1, wherein the contactless communication chip is configured to,
   generate a count number by determining a number of cycles of the internal clock signal occurring within a reference number of cycles of the reference clock signal, and
   adjust the frequency of the internal clock signal based on the count number and the reference number of cycles.

3. The contactless communication device of claim 1, wherein the contactless communication chip is configured to,
   determine an average count number by iteratively determining a number of cycles of the internal clock signal occurring within a reference number of cycles of the reference clock signal, and
   adjust the frequency of the internal clock signal based on the average count number and the reference number of cycles.

4. The contactless communication device of claim 1, wherein the contactless communication chip comprises:
   a clock generator configured to generate the internal clock signal;
   a clock recovery circuit configured to receive the antenna voltage, and to generate the reference clock signal having a same frequency as the antenna voltage;
   a first counter configured to,
   perform a count operation in synchronization with the reference clock signal to generate a first count number, if the first counter receives a start signal, and
   output a finish signal, if the first count number equals a reference number;
   a second counter configured to,
   perform a count operation in synchronization with the internal clock signal to generate a second count number, if the second counter receives the start signal, and
   output the second count number, if the first counter outputs the finish signal; and
   a central processing unit (CPU) configured to,
   provide the start signal to the first counter and the second counter at a same time, and
   control the clock generator to adjust the frequency of the internal clock signal based on the second count number and the reference number.

5. The contactless communication device of claim 4, wherein the CPU is configured to,
   increase the frequency of the internal clock signal, if the second count number is smaller than the reference number, and
   decrease the frequency of the internal clock signal if the second count number is greater than the reference number.

6. The contactless communication device of claim 4, wherein
   the contactless communication chip further includes the register configured to store the trimming value,
   the clock generator is configured to generate the internal clock signal such that the frequency of the internal clocks signal is based on the trimming value, and
   the CPU is configured to adjust the trimming value stored in the register based on the second count number and the reference number.

7. The contactless communication device of claim 6, further comprising:
   a memory configured to store a lookup table including a plurality of trimming values each associated with a difference between the second count number and the reference number, wherein
   the CPU is configured to determine the trimming value to store in the register by selecting one of the plurality of trimming values from the lookup table based on the second count number and the reference number.

8. The contactless communication device of claim 6, wherein the clock generator includes a resistor-capacitor (RC) oscillator, the RC oscillator including a variable resistor having a resistance which varies based on the trimming value stored in the register.

9. The contactless communication device of claim 6, wherein the clock generator includes a resistor-capacitor (RC) oscillator, the RC oscillator including a variable capacitor having a capacitance which varies based on the trimming value stored in the register.

10. The contactless communication device of claim 4, wherein the CPU is configured to,
    detect whether the contactless communication reader is near the contactless communication device based on the antenna voltage, and
    provide the start signal to the first counter and the second counter at the same time, if the CPU detects that the contactless communication reader is near the contactless communication device.

11. The contactless communication device of claim 10, wherein the CPU is configured to determine the reference number such that a period of the reference clock signal times the reference number is less than a guard time defined in a communication standard.

12. The contactless communication device of claim 11, wherein the CPU is configured to,
   determine an average of the second count number by iteratively providing the start signal to the first counter and the second counter at a same time and receive the second count number from the second counter until the guard time elapses, and
   adjust the frequency of the internal clock signal by controlling the clock generator based on the average of the second count number and the reference number.

13. The contactless communication device of claim 4, wherein the CPU is configured to operate in synchronization with the internal clock signal.

14. The contactless communication device of claim 4, wherein the clock recovery circuit comprises:
   an inverter configured to invert the antenna voltage.

15. The contactless communication device of claim 1, wherein the contactless communication chip is configured to communicate with the contactless communication reader and the contactless communication card through a near field communication (NFC) scheme.

16. An electronic system, comprising:
   a memory device configured to store data;
   an application processor configured to control the electronic system; and
   a contactless communication device configured to transfer data using an electromagnetic wave, the contactless communication device including,
      a transceiver configured to generate an antenna voltage based on a first electromagnetic wave received from a contactless communication reader, and
      a contactless communication chip configured to,
         generate a reference clock signal based on the antenna voltage, when the contactless communication chip operates in a card mode in response to a magnitude of the antenna voltage increasing to a card mode threshold,
         adjust, while operating in the card mode, a trimming value stored in a register, a frequency of an internal clock signal being adjusted based on the trimming value,
         generate the internal clock signal based on the trimming value such that a frequency of the internal clock signal is same as a frequency of the first electromagnetic wave, when the contactless communication chip switches from the card mode to a reader mode in response to the magnitude of the antenna voltage decreasing to a reader mode threshold, and
         communicate, while the contactless communication chip operates in the reader mode, with a contactless communication card by emitting, via the transceiver, a second electromagnetic wave based on the internal clock signal.

17. A contactless communication chip comprising:
   a processor configured to,
      instruct a clock recovery circuit to generate a reference clock signal, when the contactless communication chip operates in a card mode in response to a magnitude of an antenna voltage increasing to a card mode threshold, the antenna voltage being generated by a transceiver in response to a first electromagnetic wave from a contactless communication reader,
      adjust, while operating in the card mode, a trimming value stored in a register based on the reference clock signal, a frequency of an internal clock signal being adjusted based on the trimming value,
      instruct a clock generator to generate the internal clock signal based on the trimming value such that a frequency of the internal clock signal is same as a frequency of the first electromagnetic wave, when the contactless communication chip switches from the card mode to a reader mode in response to the magnitude of the antenna voltage decreasing to a reader mode threshold, and
      instruct, via a transmission circuit, the transceiver to communicate with a contactless communication card while the contactless communication chip operates in the reader mode by emitting a second electromagnetic wave based on the internal clock signal.

18. The contactless communication chip of claim 17, further comprising:
   the clock generator configured to generate the internal clock signal; and
   the clock recovery circuit configured to generate the reference clock signal such that the reference clock signal has a same frequency as the antenna voltage, wherein
      the processor is configured to instruct the clock generator to generate the internal clock signal such that the frequency of the internal clock signal is equal to the frequency of the first electromagnetic wave received from the contactless communication reader in the card mode.

19. The contactless communication chip of claim 18, further comprising:
   a first counter configured to,
      perform a count operation in synchronization with the reference clock signal to generate a first count number, if the first counter receives a start signal, and
      output a finish signal, if the first count number equals a reference number; and
   a second counter configured to,
      perform a count operation in synchronization with the internal clock signal to generate a second count number, if the second counter receives the start signal, and
      output the second count number, if the first counter outputs the finish signal, and wherein
   the processor is configured to output the start signal to the first counter and the second counter at a same time, if the processor detects the contactless communication reader.

20. The contactless communication chip of claim 17, wherein the processor is configured to modulate output data to generate a modulation signal, and to synthesize the modulated signal with the internal clock signal having a carrier frequency defined in a communication standard supported by the contactless communication card.

* * * * *